Dec. 12, 1967 H. E. WAKE 3,357,567

FLUID FILTERING DEVICE

Filed May 2, 1966 2 Sheets-Sheet 1

HAROLD E. WAKE
INVENTOR

Huebner & Worrel
ATTORNEYS

Dec. 12, 1967 — H. E. WAKE — 3,357,567

FLUID FILTERING DEVICE

Filed May 2, 1966 — 2 Sheets-Sheet 2

HAROLD E. WAKE
INVENTOR

Huebner & Worrel
ATTORNEYS

United States Patent Office 3,357,567
Patented Dec. 12, 1967

3,357,567
FLUID FILTERING DEVICE
Harold E. Wake, P.O. Box 880,
Lindsay, Calif. 93247
Filed May 2, 1966, Ser. No. 546,675
6 Claims. (Cl. 210—408)

ABSTRACT OF THE DISCLOSURE

A tank having separated inlet and outlet compartments with the inlet compartment including an upwardly disposed discharge opening located above the outlet compartment, filter means mounted on the tank below the discharge opening for removing extraneous material from water discharged from the discharge opening into the outlet compartment, particle conveying means mounted above the filter means providing an auxiliary flow of relatively clean water for discharge angularly downwardly against the filter means to propel extraneous material therefrom and filter sweeping means disposed below the screen for discharging relatively clean water upwardly against the screen to loosen, dislodge and propel extraneous material trapped by the screen into said auxiliary flow of water from the particle conveying means.

There has been an increasing use of sprinkler irrigation of crops, parkways, golf courses and the like particularly in rolling or hilly terrain which is not easily adapted to the usual open ditch or canal type irrigation. However, the source of water for such sprinkler irrigation systems is still frequently open canals which transmit and mix with the water substantial amounts of foreign materials, such as sand, silt, and the like, and which frequently contain substantial quantities of algae, weed seeds and debris. In some areas of the country where it would be desirable to utilize such sprinkler irrigation systems, an extremely fine volcanic ash is present in the water. The discrete particles of ash remain in a state of suspension in the water and, like the other named extraneous materials, act as an abrasive causing greatly accelerated wear on sprinkler components. Accordingly, the continuous costly and troublesome maintenance of sprinkler equipment has rendered such sprinkler irrigation systems economically prohibitive in these areas.

The fluid filtering devices of the prior art which are intended to overcome the above problems have met with only limited success. These devices usually employ a large tank having a lower outlet conduit feeding the irrigation system and a filter screen covering the top of the tank. The tank is supplied with water usually from an open ditch or canal, either by gravity or by a pumping device, which directs such supply of water through an inlet conduit located above the screen. The inlet conduit discharges the water onto only a relatively small portion of the screen directly below the conduit. Accordingly, all the filtering that is accomplished by such prior devices is confined to a relatively small area with the particles of extraneous matter separated by the screen being propelled radially outwardly from the initial splash area by the force of the water against the screen. The particles are permitted to accumulate on the screen in circumscribing relation about the splash area which, even after short periods of use, depending upon the particle content of the water, accumulates inwardly of the filtering area with many particles previously separated being broken and driven through the screen. Eventually, the screen is completely clogged and consequently rendered entirely inoperable as a filter. As a result, the screen of such conventional filtering devices requires continuous cleaning to maintain the screen in an operable condition which, even at best, permits the passage of substantial amounts of particles therethrough in view of the necessity of employing a relatively course mesh screen.

Accordingly, it is an object of the present invention to provide an improved fluid filtering device.

Another object is to provide such an improved fluid filtering device for irrigation water and the like which is capable of maintaining the water sufficiently free of extraneous material for supplying sprinkler irrigation systems.

Another object is to provide a fluid filtering device of the character described which is capable of substantially continuous uninterrupted operation with a minimum of manual attention.

Another object is to provide a fluid filtering device which is able to utilize a finer mesh filter screen than heretofore possible with conventional filtering devices.

Another object is to provide a fluid filtering device which distributes the inlet water over a wider area so as to utilize substantially the entire surface of the screen.

Another object is to provide a fluid filtering device which maintains a filter screen substantially free of any accumulation of extraneous material.

Another object is to provide a fluid filtering device which is effective automatically to discharge the separated particles of extraneous material from such a screen without attention.

Other objects and advantages of the present invention will subsequently become more clearly apparent upon reference to the following description in the specification and accompanying drawings.

Figures 1, 2:
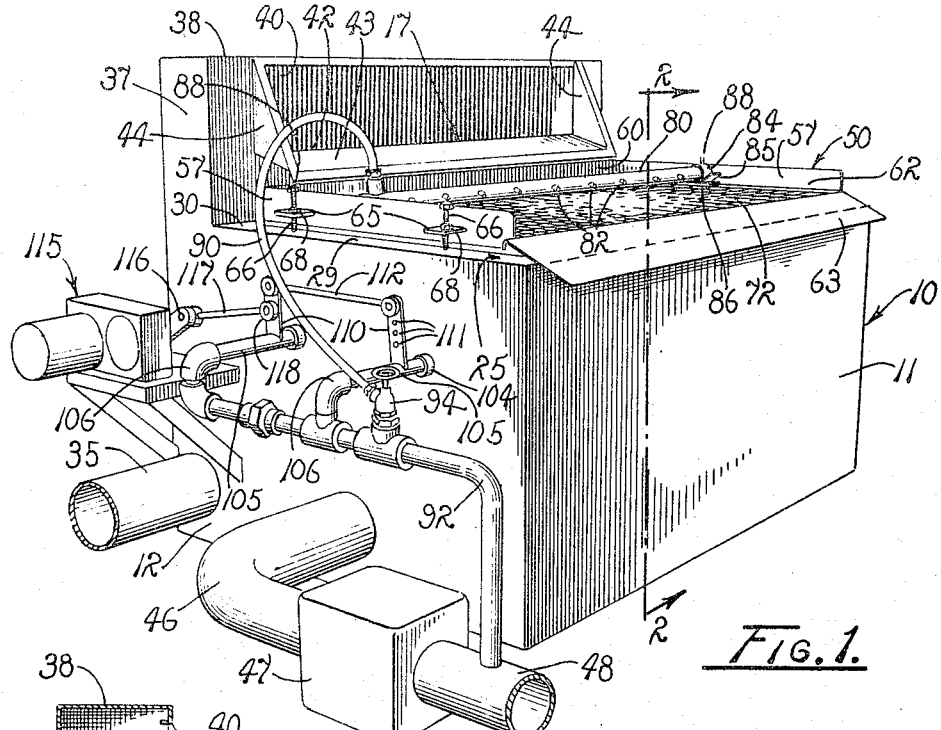
FIG. 1 is a perspective view of a fluid filtering device embodying the principles of the present invention.
FIG. 2 is a somewhat enlarged transverse vertical section through the filtering device, taken on line 2—2 of FIG. 1.
Figure 3:
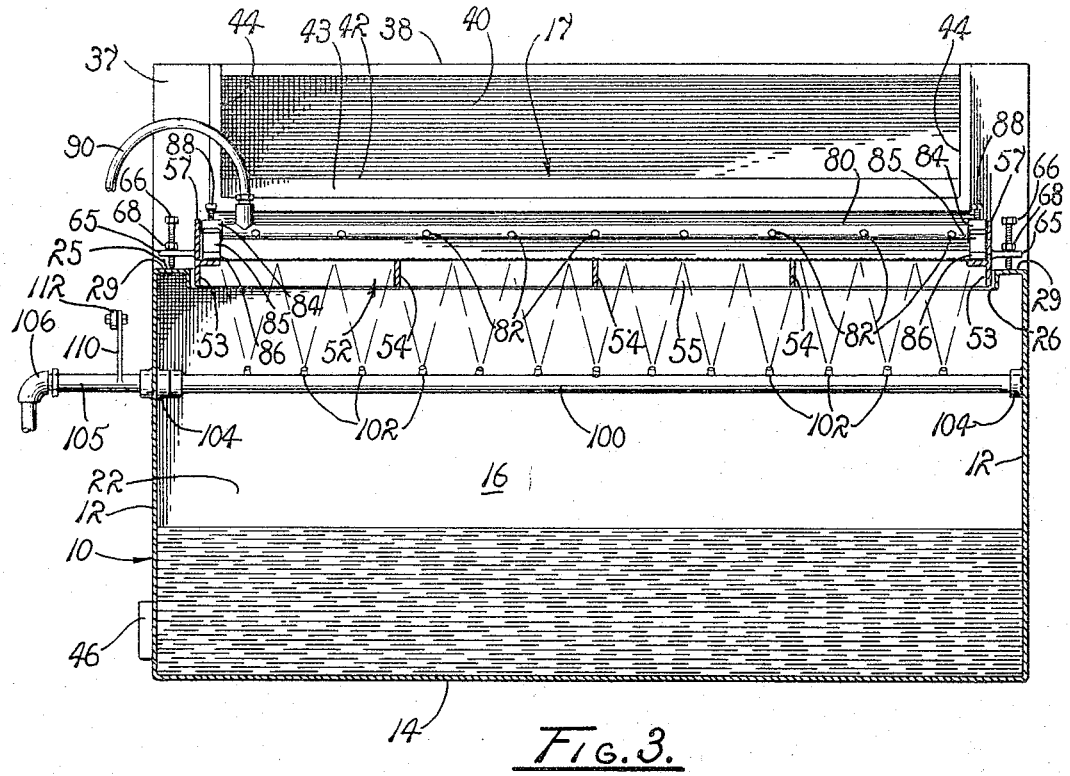
FIG. 3 is a longitudinal vertical section through the filtering device, taken generally along the line 3—3 of FIG. 2.
Figure 4:
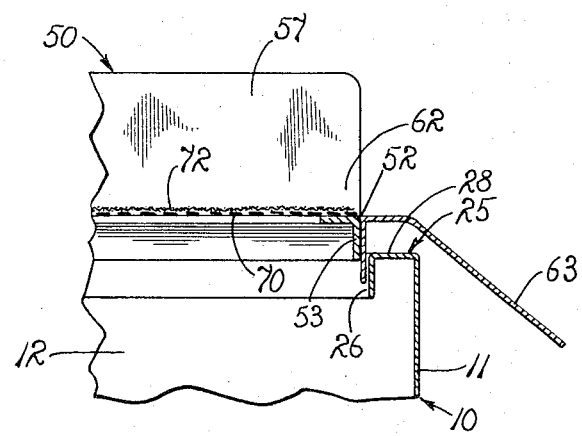
FIG. 4 is a fragmentary further enlarged section through a filter screen and debris discharge section of the fluid filtering device of the present invention.

Referring more particularly to the drawings, a fluid filtering device embodying the principles of the present invention provides an elongated substantially rectangular tank 10 having opposite side walls 11 and opposite end walls 12 interconnected by a bottom wall 14. An elongated partitioning panel 16 is mounted in the tank in longitudinally extended relation between the end walls 12 and in closely spaced substantially parallel relation to one of the side walls 11 to divide the tank into a fluid inlet compartment 20 and a relatively larger outlet compartment 22.

The tank 10 has an open top 25 which provides a substantially rectangular opening 26 into the outlet compartment 22. The opening is defined by a plurailty of marginally inwardly extended flanges 28 and 29 integral with the end and side walls 11 and 12, respectively, and by an elongated panel 30 inwardly extended from the partitioning panel 16. The inlet compartment 20 includes an elongated outwardly extended inlet conduit 35 disposed closely adjacent to the bottom wall 14 of the tank for connection with a source of irrigation water for supplying such water to the inlet compartment either by gravity or a suitable pumping apparatus, not shown. The inlet compartment includes an upper portion 37 extended above the top 25 of the tank which is formed by the partitioning panel 16 and the adjacent side wall 11 and a top wall 38. An elongated rectangular water discharge opening 40 is formed in the partitioning panel 16 and has a lower edge 42 spaced above the top panel 30 of the tank. The upper portion of the partitioning panel 16 provides a weir 17 over which water in the inlet compartment is discharged.

A water spill plate 43 is secured to the partitioning plate 16 along the lower edge 42 of the opening and is further anchored by end plates 44 for directing such overflow of water downwardly toward the opening 26 in the outlet compartment 22 of the tank. An elongated outlet conduit 46 is outwardly extended from the outlet compartment 22 of the tank for connection to the inlet or suction side of a pump 47. The pump provides a high pressure outlet conduit 48 for supplying relatively clean water to a sprinkler irrigation system or the like, not shown.

A filter mounting tray 50 is adapted to be removably mounted within the opening 26 in the top 25 of the tank 10. The tray provides a lower support frame 52 constructed of a plurality of marginally disposed angle irons 53 which are rigidly interconnected, as by welding or the like. The angle irons are further strengthened by a plurality of cross braces 54 and a centrally disposed longitudinally extended rib member 55 which are similarly secured in interconnecting relation. The tray further includes opposite upstanding end panels 57 which are interconnected by a single side panel 60. The tray includes an opposite open side 62 which has an outwardly angularly downwardly extended debris discharge plate 63 connected thereto in overhanging relation to the adjacent side wall 11 of the tank when the tray is disposed in its operating position of FIG. 2. A pair of mounting brackets 65 are outwardly extended from each of the end panels 57 of the tray in overlying relation with the upper flanges 29 of the end walls 12 of the tank. Each of the brackets screw threadably mounts an elongated adjusting bolt 66 which may be constrained in the desired adjusted position by a lock nut 68 engageable with the upper surface of its respective bracket. Accordingly, the tray may be disposed within the opening 26 of the tank in a variety of elevational or angularly tipped positions relatively to the horizontal by appropriate manipulation of the adjusting bolts 66.

A substantially rigid perforated screen support member 70 of flattened expanded metal or the like is borne by the mounting tray 50 upon the frame 52. A filter screen 72 of relatively fine mesh, preferably woven nylon cloth, is disposed within the tray in overlying relation upon the support member 70. It is noted that the filter screen is of a sufficiently fine mesh to preclude the passage of any extraneous particles in the water which might be harmful to the sprinkler components. The screen provides a water receiving section 74 disposed immediately below and coextensively contiguous with the spill plate 43 and has an opposite debris discharge station 76 continuous with the debris discharge plate 63 of the tray.

An elongated tubular water manifold 80 is mounted in longitudinally extended relation between the end panels 57 of the filter mounting tray 50. The manifold has a plurality of equally longitudinally spaced water discharge nozzles 82 extending generally toward the debris discharge station 76 of the screen. The opposite ends of the manifold are rotatably mounted in bearings 84 which are secured within V-brakets 85 supported on elongated runners 86. The runners slidably engage the upper surface of the filter screen 72 closely adjacent to the end panels 57 to permit relative sliding movement for adjusting the manifold 80 between the water receiving section 74 and the discharge station 76 of the screen. A lock bolt 88 is adjustably screw threadably mounted in the bearing to hold the manifold against rotation when the nozzles 82 are properly angularly related to the screen. A continuous supply of relatively clean water is provided the manifold by an elongated flexible hose 90 connected at its opposite end to a high pressure conduit 92 extended from the outlet conduit 48 of the pump 47. The volume of flow through the manifold is regulated by a control valve 94 in the supply conduit 92.

A pair of elongated filter sweeping pipes 100 are mounted in spaced relation within the outlet compartment 22 of the tank 10 in predetermined spaced relation beneath the opening 26 and filter screen 72. The pipes individually provide a plurality of equally axially spaced generally upwardly directed discharge nozzles 102. The opposite ends of the pipes are journaled in bearings 104 in the end walls 12 of the tank and provide outwardly extended portions 105 which are connected through rotary couplings 106 to the supply conduit 92. Each of the pipes 100 has an upstanding arm 110 secured to the outer extended portion which has a plurality of apertures 111 extended therethrough. The arms are adjustably interconnected by a connecting rod 112 pivotally secured at its ends by suitable pins extended through selected apertures of the arms.

A power driven gear reduction unit 115 is mounted on the tank 10 and provides a rotatable crank arm 116. The crank arm is adjustably connected to a push rod 117 having a distal end 118 adjustably pivotally connected to the adjacent arm 111 for rotatably oscillating the filter sweeping pipes 100 on their axes through a predetermined arc of travel sufficient to provide a spray pattern against substantially the entire undersurface of the filter screen 72.

*Operation*

The operation of the described embodiment of the subject invention is believed to be clearly apparent and is briefly summarized at this point. As previously described, irrigation water is permitted to flow into the inlet compartment 20 of the tank 10 through the inlet conduit 35 either by pumping or by a gravity feed system. The water in the inlet compartment is raised by the pressure at the source to the lower edge 42 of the opening 40 from the inlet compartment. Such water is permitted to flow over the weir 17 and downwardly upon the spill plate 43 in a continuous solid sheet. The spill plate discharges such flow of water onto the water receiving section 74 of the filter screen 72. It is noted that with the elongated opening and spill plate arrangement, the continuous uninterrupted flow of raw water is dispersed completely along the entire length of the filter screen for improved distribution and permeation of the water through the screen. During passage of the water through the relatively fine mesh screen, the discrete particles of extraneous material are separated from such water by the screen and are retained on the upper surface thereof for movement toward the debris discharge station 76. Such movement is initially caused by the angular flow of the continuous sheet of water from the spill plate tending to move the particles in a direction from left to right, as viewed in FIG. 2. Such particle movement is further enhanced by the angular disposition of the filter screen from the horizontal which is affected by adjustment by the filter mounting tray adjusting bolts 66 to elevate the water receiving section 74 slightly higher than the discharge station 76. In order to insure that such particles are completely expelled from the filter screen, the control valve 94 is opened to provide a flow of relatively clean water from the pressure side of the pump 47 to the manifold 80. This water is discharged through the nozzles 82 angularly downwardly against the filter screen and provides an auxiliary particle conveying stream to propel such particles over the debris discharge plate 63.

Upon initial introduction of water through the inlet compartment 20 of the tank 10, the gear reduction unit 115 is energized to reciprocate the arms 110 on the filter sweeping pipes 100. As described, relatively clean water from the supply conduit 92 is discharged through the sweeping nozzles 102 against the underside of the filter screen 72. During such movement, the jet spray pattern emanating from the nozzles penetrates upwardly through the screen to dislodge any particles trapped therein and to discharge them upwardly into the auxiliary particle conveying stream from the nozzles 82 of the manifold 80.

Inasmuch as the sweeping pipes 100 are continually oscillated, the jets of water discharged from the nozzles 102 alternately sweep across the underside of the filter screen so as not appreciably to inhibit the main flow of water from the spill plate 43 into the outlet compartment 22 of the tank. Accordingly, the filter screen is maintained in a condition substantially free of any accumulation of particles of extraneous material which are continuously discharged through the discharge station 76 outwardly of the tank by the discharge plate 63.

In view of the foregoing, it is readily apparent that the structure of the present invention provides an improved fluid filtering device which is able to utilize a finer mesh filter screen than heretofore possible with conventional filtering devices for the purpose and which maintains the filter screen substantially free of any accumulation of extraneous material so as virtually to eliminate periodic manual cleaning of the screen. It is further significant that the structure of the present invention evenly distributes the inlet water over a wider area of the screen than conventional devices so that the particles entrained in the water are not discharged and concentrated against the screen in a relatively small area.

Although the invention has been herein shown and described in what is conceived to be the most practical and preferred embodiment, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. A fluid filtering device comprising a tank having an open flanged top and separated inlet and outlet compartments with the inlet compartment being connected to a source of water having extraneous material entrained therein and including an elongated weir plate defining the lower edge of an upwardly disposed elongated discharge opening located above said outlet compartment, said outlet compartment including an outlet opening for directing relatively clean water from the tank; a substantially flat rectangular screen of relatively fine mesh supported in covering relation on said flanged top of the tank and including a water receiving section disposed immediately below and coextensively contiguous with the elongated discharge opening of said inlet compartment for removing extraneous material from the water discharged from said discharge opening and permitting relatively clean water to pass into said outlet compartment, said screen including a debris discharge station disposed in spaced opposed relation to said water receiving section; particle conveying means mounted immediately above said screen between its water receiving section and its debris discharge station including nozzle means connected to said outlet opening of the tank providing an auxiliary flow of relatively clean water for discharge angularly downwardly against the screen to propel extraneous material thereon toward said debris discharge station; and filter sweeping means disposed below said screen providing nozzle means directed upwardly toward the screen and connected to said outlet opening of the tank for receiving therefrom a supply of relatively clean water for discharge upwardly against the screen to loosen, dislodge, and propel extraneous material trapped by the screen into said auxiliary flow of water from said particle conveying means.

2. A fluid filtering device comprising a tank having an open flanged top and separated inlet and outlet compartments with the inlet compartment being connected to a source of water having extraneous material entrained therein and including an elongated weir plate defining the lower edge of an upwardly disposed elongated discharge opening located above said outlet compartment, said outlet compartment including an outlet opening for directing relatively clean water from the tank; a substantially flat rectangular screen of relatively fine mesh supported in covering relation on said flanged top of the tank and including a water receiving section disposed immediately below and coextensively contiguous with the elongated discharge opening of said inlet compartment for removing extraneous material from the water discharged from said discharge opening and permitting relatively clean water to pass into said outlet compartment, said screen including a debris discharge station disposed in spaced opposed relation to said water receiving section; particle conveying means mounted immediately above said screen between its water receiving section and its debris discharge station including nozzle means connected to said outlet opening of the tank providing an auxiliary flow of relatively clean water for discharge angularly downwardly against the screen to propel extraneous material thereon toward said debris discharge station; filter sweeping means (comprises) including an elongated pipe having opposite ends journaled in the tank in spaced coextensively contiguous relation beneath the screen and providing a plurality of equally axially spaced nozzles generally upwardly extended with an end of the pipe connected to said outlet opening of the tank for discharging relatively clean water therefrom through said nozzles and against the screen to loosen, dislodge, and propel extraneous material trapped by the screen into said auxiliary flow of water from said particle conveying means, and powered means for oscillating said pipe through a predetermined arc of travel so that water discharged from the nozzles is directed in sweeping relation against the screen.

3. A fluid filtering device comprising a tank having an upper open flanged top and separated inlet and outlet compartments with the inlet compartment being connected to a source of fluid having extraneous material entrained therein, said inlet compartment having an upwardly disposed discharge opening located above said outlet compartment, said outlet compartment including an outlet opening for directing relatively clean water from the tank; a weir plate mounted in said discharge opening over which fluid in said inlet compartment is discharged in an elongated continuously uninterrupted sheet; a substantially flat rectangular filter screen of relatively fine mesh; tray means supporting said screen on said flanged open top of the tank in covering relation with the screen providing a fluid receiving section disposed immediately below and coextensively contiguous with the sheet of such fluid being discharged over said weir plate and including a debris discharge station disposed in spaced opposed relation to said fluid receiving section of the screen; an elongated tubular fluid manifold adjustably mounted in said tray means immediately above the screen intermediate its fluid receiving section and its debris discharge station and including a plurality of axially spaced nozzles, said manifold being connected to said outlet opening of the tank for discharging an auxiliary flow of fluid angularly downwardly against the screen to propel extraneous material thereon toward said debris discharge station; an elongated fluid discharge pipe having opposite ends journaled in the tank in coextensively contiguous relation beneath the screen and providing a plurality of equally axially spaced nozzles generally upwardly extended with an end of the pipe connected to said opening of the tank for discharging relatively clean water therefrom through said nozzles and against the screen to loosen, dislodge, and propel into said auxiliary flow from said manifold; and powered means for oscillating said pipe about its axis through a predetermined arc of travel so that water discharged from the nozzles is directed in sweeping relation against the screen.

4. The fluid filtering device of claim 3 including connector means for adjusting the arc of travel of said pipe so as to accommodate various sizes of screens.

5. The fluid filtering device of claim 4 wherein a plurality of said fluid discharge pipes are mounted in said outlet compartment of the tank, and means adjustably interconnecting said powered means and said pipes for simultaneous oscillation of the pipes.

6. A fluid filtering device comprising a tank having separated inlet and outlet compartments with the inlet compartment being connected to a source of water having extraneous material entrained therein and having an upwardly disposed elongated discharge opening located above said outlet compartment, said outlet compartment including an outlet opening for directing relatively clean water from the tank; filter means mounted on the tank having a water receiving section disposed immediately below and coextensively contiguous with the elongated discharge opening of said inlet compartment for removing extraneous material from the water discharged from said discharge opening and permitting relatively clean water to pass into said outlet compartment, said filter means including a debris discharge station disposed in spaced opposed relation to said water receiving section; particle conveying means mounted immediately above said filter means between its water receiving section and its debris station including nozzle means connected to said outlet opening of the tank providing an auxiliary flow of relatively clean water for discharge angularly downwardly against the filter means to propel extraneous material thereon toward said debris discharge station; and filter sweeping means disposed below said filter means within said outlet compartment and being connected to said outlet opening of the tank for receiving therefrom a supply of relatively clean water for discharge upwardly against said filter means to loosen, dislodge and propel extraneous material trapped by the filter means into said auxiliary flow of water from said particle conveying means.

References Cited

UNITED STATES PATENTS

| | | | |
|---|---|---|---|
| 2,039,573 | 5/1936 | Weber | 210—389 |
| 2,329,295 | 9/1943 | Reagan | 210—388 X |
| 3,282,430 | 11/1966 | Kinne | 210—162 |

FOREIGN PATENTS 52,610    5/1933    Norway.

REUBEN FRIEDMAN, *Primary Examiner.*

J. ADEE, *Assistant Examiner.*